United States Patent [19]
Jung

[11] Patent Number: 5,710,838
[45] Date of Patent: Jan. 20, 1998

[54] APPARATUS FOR ENCODING A VIDEO SIGNAL BY USING MODIFIED BLOCK TRUNCATION AND CONTOUR CODING METHODS

[75] Inventor: Hae-Mook Jung, Seoul, Rep. of Korea

[73] Assignee: Daewoo Electronics Co., Ltd., Seoul, Rep. of Korea

[21] Appl. No.: 622,533

[22] Filed: Mar. 25, 1996

[30] Foreign Application Priority Data

Mar. 28, 1995 [KR] Rep. of Korea .................. 95-6619

[51] Int. Cl.⁶ .................................................. G06K 9/00
[52] U.S. Cl. ................................... 382/242; 382/243
[58] Field of Search .............................. 382/164, 165, 382/166, 170, 171, 172, 173, 178, 179, 180, 181, 190, 203, 224, 232, 233, 235, 236, 237, 238, 239, 241, 242, 243, 244, 248, 251, 253, 282, 283, 284, 302, 309, 133, 204, 286; 348/416, 699, 138; 395/121, 126, 135, 502; 345/139, 189

[56] References Cited

U.S. PATENT DOCUMENTS 3,805,028  4/1974  Morton ...................... 235/92 PC
4,737,921  4/1988  Goldwasser et al. .............. 364/518
5,594,504  1/1997  Ebrahimi ......................... 348/416

*Primary Examiner*—Leo Boudreau
*Assistant Examiner*—Bijan Tadayon
*Attorney, Agent, or Firm*—Anderson Kill & Olick, P.C.

[57] ABSTRACT

An apparatus for encoding a input video signal having a plurality of video frames each of which may be divided into a multiplicity of non-overlapping blocks of K×K pixels by using a modified BTC method and a contour coding method, with the apparatus including a masking block for providing a binary frame of the input video signal, a contour coding block for generating contour and binary information for the binary frame, a control block, for each binary block derived from the binary frame, for determining a number L and a control signal, a modified BTC block, for each video block derived from the input video signal, for generating a mean value and two reconstruction values based on intensity values of the K×K pixels within each video block and the number L, and selecting either the mean value or the two reconstruction values in response to the control signal.

4 Claims, 3 Drawing Sheets

FIG. 1A
(PRIOR ART)

| $f_1$ | $f_2$ | $f_3$ | $f_4$ |
|---|---|---|---|
| $f_5$ | $f_6$ | $f_7$ | $f_8$ |
| $f_9$ | $f_{10}$ | $f_{11}$ | $f_{12}$ |
| $f_{13}$ | $f_{14}$ | $f_{15}$ | $f_{16}$ |

FIG. 1B
(PRIOR ART)

| A | A | A | B |
|---|---|---|---|
| A | A | A | B |
| A | A | B | B |
| B | B | B | B |

FIG. 1C
(PRIOR ART)

| 0 | 0 | 0 | 1 |
|---|---|---|---|
| 0 | 0 | 0 | 1 |
| 0 | 0 | 1 | 1 |
| 1 | 1 | 1 | 1 |

APPARATUS FOR ENCODING A VIDEO SIGNAL BY USING MODIFIED BLOCK TRUNCATION AND CONTOUR CODING METHODS

FIELD OF THE INVENTION

This invention relates to a video signal encoding apparatus; and, more particularly, to an apparatus for encoding a video signal by using a modified block truncation coding ("BTC") method and a contour coding method.

DESCRIPTION OF THE PRIOR ART

In various electronic applications, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of the digital data through the fixed channel, a video signal encoding method is normally used to compress the digital data.

A BTC method is one of such video signal compression techniques, which greatly reduces the amount of digital data while maintaining the picture quality of the video signal transmitted.

To encode a video signal by using the BTC method, a frame of video signal is divided into non-overlapping blocks of K×K pixels, K being a positive integer larger than 1. Referring to FIG. 1A, there is shown an exemplary block as a unit of encoding in the BTC method. The block in FIG. 1A is shown to include 16 pixels, $f_1$ to $f_{16}$.

The $N(=K^2)$ pixels in a block are further divided into two groups (a bright and a dark groups) by comparing intensity values of the pixels with a threshold value; and the intensity values of the pixels included in the block are then converted to one of two reconstruction values each of which denotes a representative intensity value of the pixels included in the bright or the dark group, respectively. In FIG. 1B, A and B represent the respective reconstruction values: A for the dark group; and B for the bright group. Consequently, the block is expressed by the two reconstruction values, forming a pattern. The pattern may be further expressed by a bit plane, i.e., a block of binary images such as the one shown in FIG. 1C.

The two reconstruction values are determined from a sample mean, which is usually used as the threshold value mentioned above, and a sample variance which characterizes the contrast of the block. The sample mean $f_M$ and the sample variance $f_V$ of the intensity values of the pixels included in the block shown in FIG. 1A may be calculated as follows:

$$f_M = \frac{1}{N} \sum_{i=1}^{N} f_i \qquad \text{Eq. 1}$$

$$f_V = \sqrt{\frac{1}{N} \sum_{i=1}^{N} (f_i^2 - f_M^2)} \qquad \text{Eq. 2}$$

wherein N represents the number of pixels contained in the block; i denotes an integer ranging from 1 to N; and $f_i$ is an intensity value of a pixel denoted with the same symbol in FIG. 1A.

The two reconstruction values are decided in such a manner that the sample mean and sample variance for the two-tone block shown in FIG. 1B are the same as those of the original block shown in FIG. 1A, respectively. To do this, the two reconstruction values, i.e., A and B, are determined as follows:

$$A = f_M - f_V \sqrt{\frac{L}{N-L}} \qquad \text{Eq. 3}$$

$$B = f_M + f_V \sqrt{\frac{N-L}{L}}$$

wherein L represents the number of pixels whose intensity values are greater than or equal to the sample mean $f_M$.

Referring back to FIG. 1B, pixels whose intensity values are less than $f_M$ are represented by A while the others are represented by B. On the other hand, in the bit plane shown in FIG. 1C, pixels whose intensity values are smaller than $f_M$ are represented by 0 while the others are represented by 1.

The two reconstruction values and the bit plane determined at an encoder are transmitted to a corresponding decoder wherein the bit plane indicates whether each pixel in the block belongs to the bright group or the dark group and each of the two reconstruction values represents reconstructed pixel values in each group, respectively, at the decoder.

By representing a block of video signal by two reconstruction values and a bit plane, the amount of data to be transmitted is greatly reduced.

At the corresponding decoder, the bit plane as well as the two reconstruction values decoded forms a block of reconstructed video signal. There may exist nontrivial differences between the original and the reconstructed video signal, because as many as K×K different pixel intensity values are represented by only two reconstruction values. However, since the sample mean and the sample variance for each of the blocks are preserved throughout the whole BTC process, the brightness, the contrast and most visible features within a frame are well preserved, wherein smaller variations may be concealed by a large variation but retained in the absence thereof. This will match the human visual system's response closely in that a large variation tends to mask smaller variations within their vicinity. Therefore, the reconstructed video signal can be a good approximation of the original signal despite the large reduction in the number of bits achieved during the BTC process.

On the other hand, if every binary pixel included in the bit plane is transmitted without further processing, as many as K×K bits are required to represent the bit plane. Therefore, the number of bits used in encoding a frame of video signal will be equal to the number of pixels in the frame added by the number of bits consumed in encoding the reconstruction values for each of the blocks. Although the number of bits to be transmitted is reduced by using the conventional BTC method, a large number of bits are still needed in transmitting the bit plane, thus calling for a further reduction in the number of bits used in encoding a video signal.

SUMMARY OF THE INVENTION

It is, therefore, a primary object of the invention to provide an apparatus, for use in an encoder which encodes a video signal by using a modified BTC method and a contour coding method combined together, thereby enabling a further reduction of bit rates of the encoded video signal.

In accordance with the present invention, there is provided an apparatus for encoding an input video signal including a plurality of frames containing pixels therein, the apparatus comprising: a masking block for comparing the intensity value of each pixel in each of frames with a threshold value and making a binary frame composed of binary pixels; a contour coding block for contour coding the binary frame, thereby providing information capable of reconstructing the binary frame; a first dividing block for dividing the binary frame into a multiplicity of non-overlapping blocks each of which contains K×K pixels, K being a positive integer larger than 1; a first calculation block for calculating the number L of pixels in each block whose intensity values are greater than or equal to the threshold value; a control signal generation block, for each block, for providing a first control signal if all binary values of the block are either 0 or 1, and generating a second control signal if the block includes both 0 and 1; a second dividing block for dividing the frame of the input video signal into exactly the same multiplicity of blocks, each consisting of K×K pixels, as the ones obtained by the first dividing block; a second calculation block, for each block attained at the second dividing block, for determining a sample mean value and a sample variance of the K×K pixels; a third calculation block, for each block attained at the second dividing block, for calculating two reconstruction values in response to the sample mean value, the sample variance and the number L, each of the reconstruction values denoting a representative intensity value of the pixels included in either a bright or a dark group decided based on the intensity values of the pixels; a selection block for selecting either of the sample mean value and the two reconstruction values in response to the first or the second control signal; and an encoding block for encoding the selected values, i.e., the output of the selection block.

BRIEF DESCRIPTION OF THE DRAWINGS

The above and other objects and features of the present invention will become apparent from the following description of preferred embodiments given in conjunction with the accompanying drawings, in which:

FIGS. 1A to 1C exemplify a block of video signal, its corresponding two-tone block and a bit plane used in the conventional BTC method, respectively;

DETAILED DESCRIPTION OF THE PREFERRED EMBODIMENTS

Figure 2:
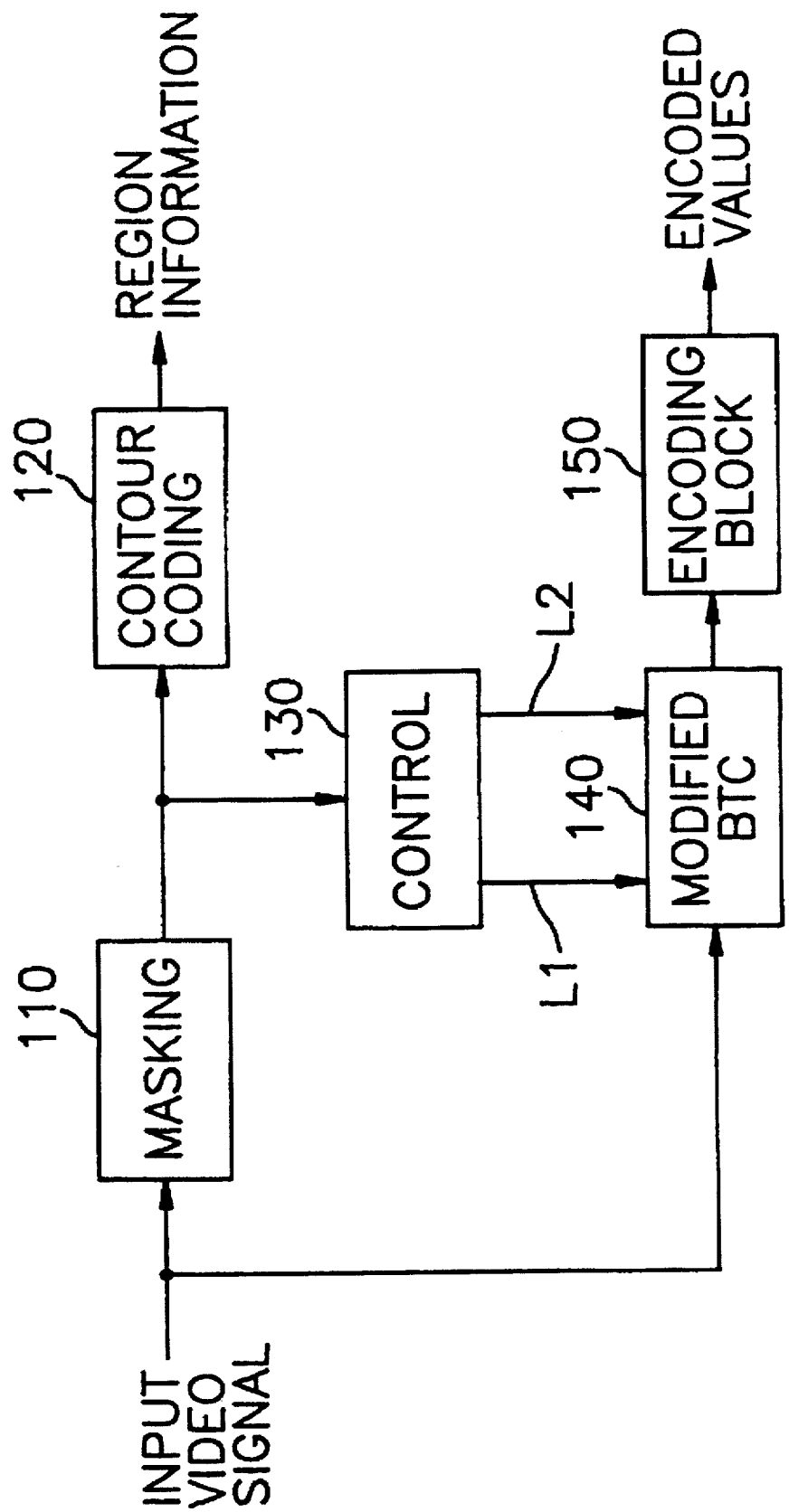
FIG. 2 provides a block diagram of a video signal encoder of the present invention.

Referring to FIG. 2, there is shown a block diagram of a video signal encoder 10 of the present invention which includes a masking block 110, a contour coding block 120, a control block 130, a modified BTC block 140 and an encoding block 150.

An input video signal coupled to the masking block 110 includes a sequence of frames of pixels and the intensity value of each pixel in a frame of the video signal is compared with a threshold value at the masking block 110. In accordance with a preferred embodiment of the present invention, a mean of intensity values of all the pixels included in the frame of the video signal is used as the threshold value. If the intensity value of a pixel is smaller than the threshold value, the pixel is represented by a binary value, e.g., 0, and otherwise by a binary value 1. Consequently, the frame of the video signal is expressed as a binary frame at the masking block 110 wherein the binary frame includes a plurality of regions, each of the regions consisting of continuous pixels represented by an identical digit of 1 or 0. The binary frame is then outputted to the contour coding block 120 and the control block 130.

At the contour coding block 120, contours of the regions included in the binary frame is coded by a conventional contour coding method such as a B-spline approximation or a polygonal approximation scheme, thereby providing region information. The region information includes contour information for each region and binary information representing a digit, i.e., 1 or 0, of pixels included in each region. The contour information is for tracing the contour or the boundary for each region and includes position data of the pixels on the boundary. The binary information denotes whether or not the intensity values of pixels within the region enclosed by the contour are smaller than the threshold value. The contour information and the binary information are then coupled to a transmitter(not shown) for the transmission thereof.

At the control block 130, the binary frame provided from the masking block 110 is first divided into a multiplicity of non-overlapping blocks of K×K pixels, K being a positive integer larger than 1. And if all the K×K pixels in a block are of a same digit, i.e., 1 or 0, a control signal S1 is coupled on a line L1; and, otherwise, i.e., if a block has pixels of digits 0 and 1 therein, a control signal S2 is outputted on the line L1. The control block 130 also calculates, for each block, the number L of pixels whose intensity values are greater than or equal to the threshold value mentioned at the masking block 110, i.e., the number of pixels in each block represented by a digit 1, and provides the number L to the modified BTC block 140 through a line L2.

In the meantime, the input video signal is also fed to the modified BTC block 140 wherein each frame of the video signal is processed by using a modified BTC method in accordance with the present invention.

Figure 3:
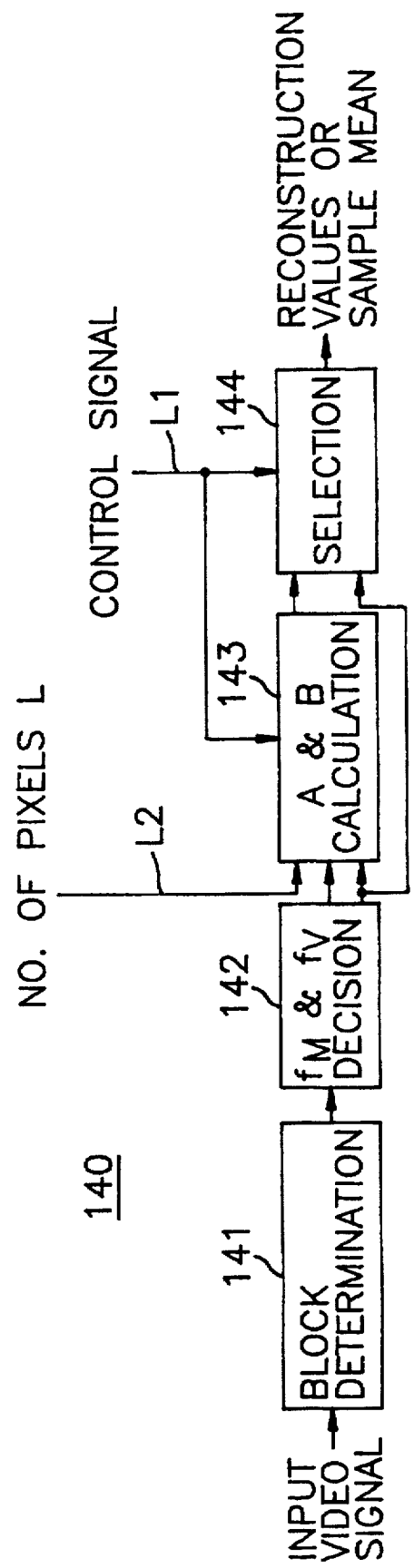
FIG. 3 offers a detailed block diagram of a modified BTC block shown in FIG. 2.

Referring to FIG. 3, there is illustrated a detailed block diagram of the modified BTC block 140 shown in FIG. 2. The modified BTC block 140 includes a block determination block 141, a $f_M$ & $f_V$ decision block 142, an A & B calculation block 143 and a selection block 144.

At the block determination block 141, each frame of the input video signal is divided into a multiplicity of blocks of K×K pixels, which are identical to the ones divided at the control block 130; and transferred to the $f_M$ & $f_V$ decision block 142 on a block-by-block basis. At the $f_M$ & $f_V$ decision block 142, a sample mean value, $f_M$, and a sample variance, of K×K pixels included in each block are determined in a same manner as described above with respect to Eqs. 1 and 2. The sample variance is then coupled to the A & B calculation block 143 and the sample mean value is fed to the A & B calculation block 143 and the selection block 144.

At the A & B calculation block 143, two reconstruction values, A and B, are calculated only for each block corresponding to the control signal S2 on the line L1 by using Eq. 3 based on the sample mean value, the sample variance, the number L delivered through the line L2 and the number N(=K×K) for the block. In other words, the reconstruction values are calculated for a block if a control signal corresponding thereto is S2. If the control signal S1 for a block is fed to A & B calculation block 143, the calculation of the reconstruction values is not carried out therein. The two reconstruction values thus calculated are transferred to the selection block 144. It should be apparent to those skilled in the art that, through the use of the reconstruction values thus obtained, it is still possible to preserve the mean and variance of the pixel intensities for a block having a contour determined by the threshold value of the present invention.

It should be noted that the contour is determined, in accordance with the present invention, by the mean of the intensity values of all the pixels within a frame, rather than the mean pixel value of the block employed in the conventional BTC method.

The selection block 144 chooses for a block either of the sample mean value and the two reconstruction values in response to a control signal coupled from the line L1. To wit, if the control signal S1 is fed to the selection block 144, the sample mean value is chosen for the block; and if the control signal S2 is supplied, the two reconstruction values are selected.

Referring back to FIG. 2, the selected values for the blocks are fed to the encoding block 150 and encoded therein through the use of an .appropriate coding scheme, e.g., DPCM(differential pulse code modulation) technique. The encoded values are then outputted to a transmitter(not shown) for the transmission thereof.

The region information, including the contour information and the binary information, for the regions of the binary frame and encoded values for the blocks thus generated at the encoder 10 are transmitted to a corresponding decoder at the receiving end. At the corresponding decoder, the region information is decoded to thereby reconstruct the binary frame generated at the masking block 110 of the encoder 10 shown in FIG. 2, while the encoded values transmitted are decoded into a sequence of decoded sample mean value and reconstruction values. Subsequently, the reconstructed binary frame is divided into a multiplicity of block of K×K pixels in a similar manner as performed in the control block 130 of the encoder 10. One or two decoded values are then sequentially assigned to each block of K×K pixels depending on the pixel values therein. Specifically, if all the pixels in a block are of an identical digit, i.e., 1 or 0, only one decided value, which is a sample mean value for the block determined at the $f_M$ & $f_V$ decision block 142 in FIG. 3, is assigned as a representative pixel value for all the pixels in the block. In case all the pixels in a block are not of an identical value, i.e., some pixels are of a digit 1 while others being of a digit 0, two decoded values, which are two reconstruction values A and B for the block provided at the A & B calculation block 143 shown in FIG. 3, are assigned as representative pixel values for the block/wherein each pixel having a digit 0 is replaced by the reconstruction value A and each pixel of a digit 1 is replaced by B.

As described above, by incorporating the modified BTC method and the contour coding method for encoding contours determined in accordance with the invention, the number of bits for encoding a video signal is reduced compared with the conventional BTC method.

While the present invention has been described with respect to certain preferred embodiments only, other modifications and variations may be made without departing from the spirit and scope of the present invention as set forth in the following claims.

What is claimed is:

1. An apparatus for encoding a video signal having a plurality of video frames, each of the video frames containing pixels therein, said apparatus comprising:

means for comparing an intensity value of each pixel contained in a video frame with a threshold value and classifying each pixel into one of two groups based on a comparison result between the intensity value of each pixel and the threshold value to thereby provide a binary frame, the binary frame including a plurality of regions, each of the regions consisting of continuous pixels classified into one of the two groups;

means for coding the binary frame to thereby provide region information including contour information and binary information, the contour information representing position data of pixels on a contour of each region and the binary information representing a group into which pixels included in each region are classified;

means for dividing the binary frame into a multiplicity of non-overlapping binary blocks, each of the binary blocks containing K×K pixels with K being a positive integer larger than 1;

means, for each binary block, for determining the number L of pixels classified into one of the two groups and included in each binary block;

means, for each binary block, for generating a control signal representing whether or not all of the K×K pixels in each binary block belong to only one of the two groups;

means for dividing the video frame into a multiplicity of non-overlapping video blocks of K×K pixels, each video block corresponding to one of the binary blocks, and providing, for each video block, a mean value and two reconstruction values based on intensity values of the K×K pixels therein and the number L determined for a corresponding binary block thereof; and means, in response to the control signal, for selecting the mean value if the control signal represents that all of the pixels in the corresponding binary block belong to one of the two groups and selecting the two reconstruction values if otherwise, to thereby generate a selected output for each video block.

2. The apparatus according to claim 1, wherein the threshold value is a mean of intensity values of the pixels included the video frame.

3. The apparatus according to claim 2, wherein said two reconstruction values are provided for a video block only if the control signal represents that all of the pixels in a corresponding binary block do not belong to only one of the two groups.

4. The apparatus according to claim 1, further comprising means for encoding the selected output for each video block.

* * * * *